United States Patent
Biskeborn et al.

(10) Patent No.: US 9,443,540 B2
(45) Date of Patent: Sep. 13, 2016

(54) HIGH DENSITY TIMING BASED SERVO FORMAT

(71) Applicant: International Business Machines Corporation, Armonk, NY (US)

(72) Inventors: Robert G. Biskeborn, Hollister, CA (US); Mark A. Lantz, Adliswill (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/849,525

(22) Filed: Sep. 9, 2015

(65) Prior Publication Data

US 2015/0380015 A1 Dec. 31, 2015

Related U.S. Application Data

(63) Continuation of application No. 14/535,251, filed on Nov. 6, 2014, now Pat. No. 9,165,600, which is a continuation of application No. 13/964,614, filed on Aug. 12, 2013, now Pat. No. 8,902,537.

(51) Int. Cl.
  *G11B 5/09* (2006.01)
  *G11B 5/008* (2006.01)
  *G11B 5/584* (2006.01)
  *G11B 20/12* (2006.01)
  *G11B 15/18* (2006.01)

(52) U.S. Cl.
  CPC .......... *G11B 5/00817* (2013.01); *G11B 5/584* (2013.01); *G11B 15/18* (2013.01); *G11B 20/1202* (2013.01)

(58) Field of Classification Search
  CPC ..... G11B 5/584; G11B 5/5508; G11B 5/588; G11B 5/5504; G11B 27/3027; G11B 2220/90; G11B 5/012; G11B 15/52; G11B 15/1875; G11B 27/10
  USPC ......... 360/48, 75, 77.13, 77.12, 74.1, 78.04, 360/73.04
  See application file for complete search history.

(56) References Cited

U.S. PATENT DOCUMENTS

| 6,842,305 B2 | 1/2005 | Molstad et al. |
|---|---|---|
| 7,095,583 B2 | 8/2006 | Johnson et al. |
| 7,538,969 B2 * | 5/2009 | Weber .................... G11B 5/584 360/77.12 |

(Continued)

OTHER PUBLICATIONS

Han et al., "Evaluation of Track Following Servo Performance for Patterned Servo Sectors in Hard Disk Drives," Joint 48th IEEE Conference on Decision and Control and 28th Chinese Control Conference, Dec. 16-18, 2009, pp. 7539-7544.

(Continued)

*Primary Examiner* — Nabil Hindi
(74) *Attorney, Agent, or Firm* — Zilka-Kotab, PC

(57) ABSTRACT

A product according to one embodiment includes a magnetic recording tape having opposite ends and at least one servo track, a longitudinal axis of the magnetic recording tape being defined between the ends. The at least one servo track has a plurality of straight first magnetic bars, and a plurality of straight second magnetic bars spaced from the first magnetic bars. A width of each of the at least one servo track is defined in a direction perpendicular to the longitudinal axis of the magnetic recording tape between sides of the servo track, the sides of each servo track extending along opposite ends of the each of the first magnetic bars. Lengths of the second magnetic bars between outermost ends thereof are less than the width of the associated servo track.

16 Claims, 10 Drawing Sheets

(56) References Cited

U.S. PATENT DOCUMENTS

| | | | |
|---|---|---|---|
| 7,684,143 | B2 | 3/2010 | Jaquette |
| 7,724,466 | B2 | 5/2010 | Bui et al. |
| 7,764,460 | B2 | 7/2010 | Bates et al. |
| 7,832,084 | B2 | 11/2010 | Dugas et al. |
| 7,876,521 | B2 | 1/2011 | Cherubini et al. |
| 8,089,716 | B2 | 1/2012 | Takayama et al. |
| 8,902,537 | B1 | 12/2014 | Biskeborn et al. |
| 9,019,653 | B2 | 4/2015 | Biskeborn et al. |
| 9,324,350 | B2 | 4/2016 | Biskeborn et al. |
| 2003/0123181 | A1 | 7/2003 | Hennecken et al. |
| 2008/0144211 | A1 | 6/2008 | Weber et al. |
| 2011/0051283 | A1 | 3/2011 | Harper et al. |
| 2012/0050909 | A1 | 3/2012 | Lantz et al. |
| 2015/0043101 | A1 | 2/2015 | Biskeborn et al. |
| 2015/0062741 | A1 | 3/2015 | Biskeborn et al. |
| 2015/0206546 | A1 | 7/2015 | Biskeborn et al. |

OTHER PUBLICATIONS

IBM, "Timing-Based-Slope Measurement for M-Pattern Timing-Based-Servo," IP.com, May 11, 2007, pp. 1-3.

Lantz et al., "Servo-Pattern Design and Track-Following Control for Nanometer Head Positioning on Flexible Tape Media," IEEE Transactions on Control Systems Technology, vol. 20, No. 2, Mar. 2012, pp. 369-381.

Non-Final Office Action from U.S. Appl. No. 13/964,614, dated Mar. 21, 2014.

Notice of Allowance from U.S. Appl. No. 13/964,614, dated Jul. 23, 2014.

Non-Final Office Action from U.S. Appl. No. 14/535,251, dated Feb. 5, 2015.

Notice of Allowance from U.S. Appl. No. 14/535,251, dated Jun. 9, 2015.

Non-Final Office Action from U.S. Appl. No. 13/964,643, dated Jun. 11, 2014.

Notice of Allowance from U.S. Appl. No. 13/964,643, dated Dec. 23, 2014.

Corrected Notice of Allowance from U.S. Appl. No. 13/964,643, dated Mar. 5, 2015.

Non-Final Office Action from U.S. Appl. No. 14/671,819, dated Apr. 24, 2015.

Biskeborn et al., U.S. Appl. No. 13/964,614, filed Aug. 12, 2013.

Biskeborn et al., U.S. Appl. No. 14/535,251, filed Nov. 6, 2014.

Biskeborn et al., U.S. Appl. No. 13/964,643, filed Aug. 12, 2013.

Biskeborn et al., U.S. Appl. No. 14/671,819, filed Mar. 27, 2015.

Notice of Allowance from U.S. Appl. No. 14/671,819, dated Jan. 21, 2016.

Final Office Action from U.S. Appl. No. 14/671,819, dated Oct. 19, 2015.

* cited by examiner

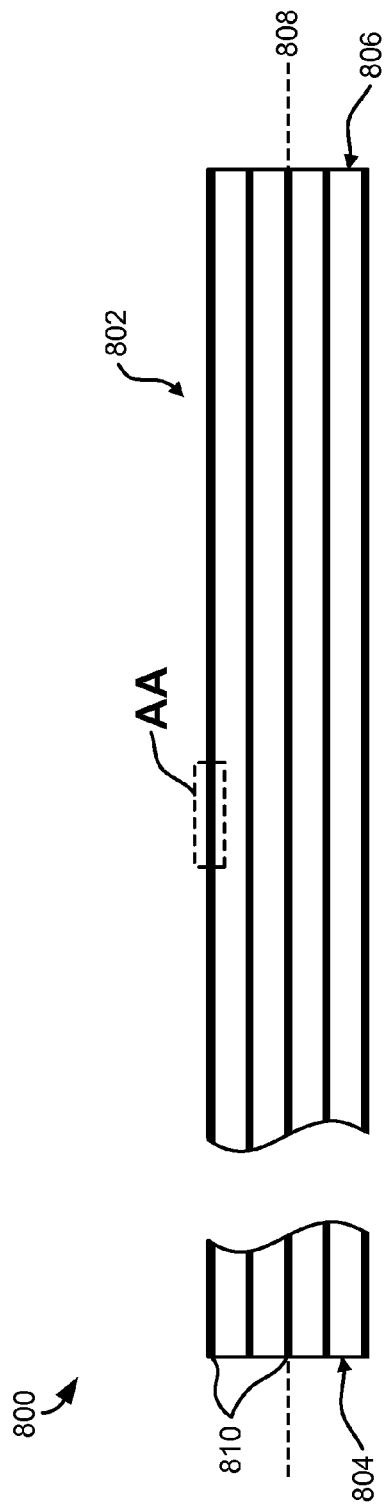
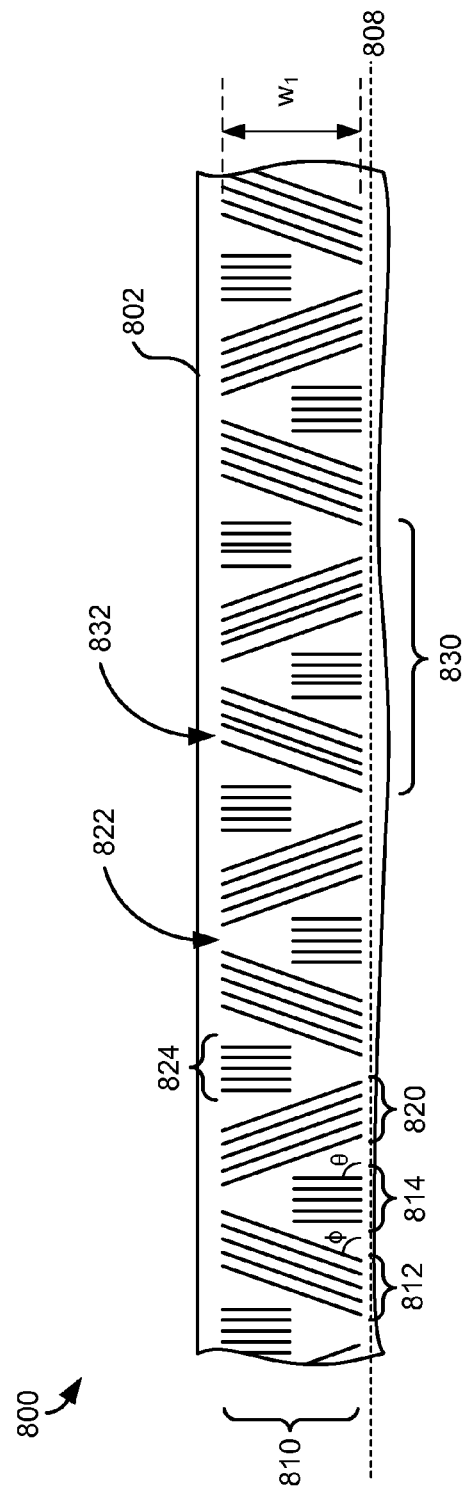
FIG. 8A
FIG. 8B

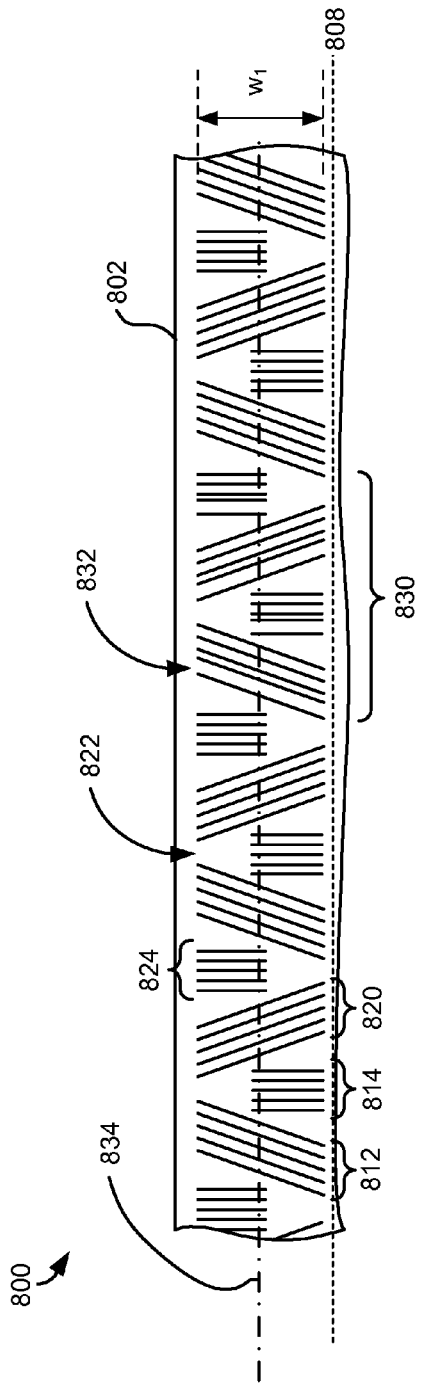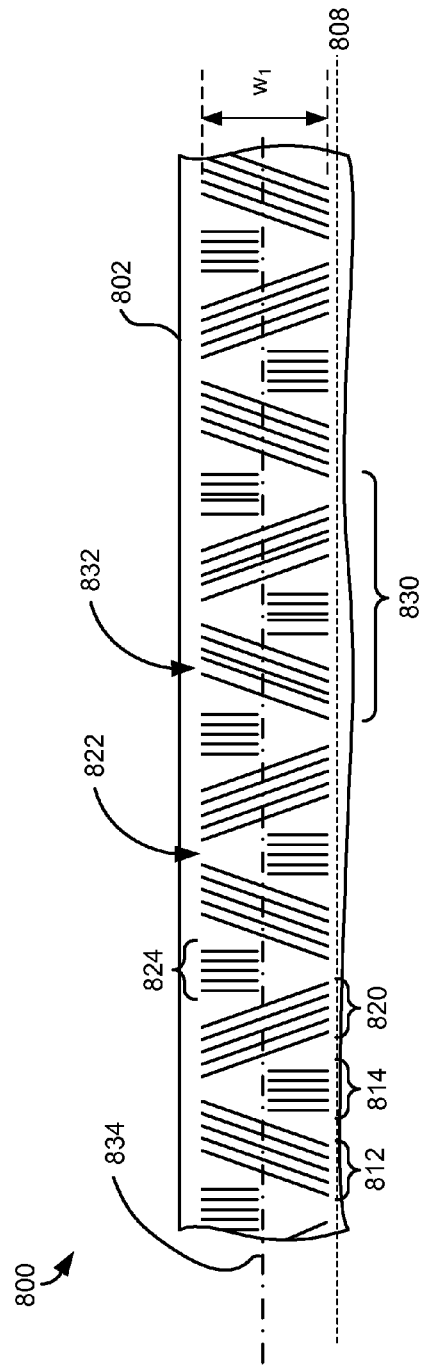

HIGH DENSITY TIMING BASED SERVO FORMAT

BACKGROUND

The present invention relates to data storage systems, and more particularly, this invention relates to a high density timing based servo format, a tape having said servo format, and related apparatuses compatible therewith.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

A product according to one embodiment includes a magnetic recording tape having opposite ends and at least one servo track, a longitudinal axis of the magnetic recording tape being defined between the ends. The at least one servo track has a plurality of straight first magnetic bars, and a plurality of straight second magnetic bars spaced from the first magnetic bars. A width of each of the at least one servo track is defined in a direction perpendicular to the longitudinal axis of the magnetic recording tape between sides of the servo track, the sides of each servo track extending along opposite ends of the each of the first magnetic bars. Lengths of the second magnetic bars between outermost ends thereof are less than the width of the associated servo track.

An apparatus according to one embodiment includes a magnetic head; a drive mechanism for passing such a magnetic recording tape over the magnetic head; and a controller electrically coupled to the magnetic head, the controller being configured to decode the servo track(s) of the magnetic recording tape.

An apparatus according to another embodiment includes a magnetic head having at least one servo writer for writing the magnetic bars to a magnetic recording tape; a drive mechanism for passing the magnetic recording tape over the magnetic head; and a controller electrically coupled to the magnetic head.

A computer program product for writing servo tracks on a magnetic recording tape according to one embodiment includes a computer readable storage medium having program instructions embodied therewith. The computer readable storage medium is not a transitory signal per se. The program instructions are executable by a controller to cause the controller to perform a method including writing at least one servo track on a magnetic recording tape. The at least one servo track has a plurality of first magnetic bars and a plurality of second magnetic bars. A width of each of the at least one servo track is defined between sides of the servo track in a direction perpendicular to the longitudinal axis of the magnetic recording tape, where the sides of each servo track extending along ends of the first magnetic bars. Lengths of the second magnetic bars along the longitudinal axes thereof are less than the width of the associated servo track. The second magnetic bars each have a longitudinal axis oriented substantially 90 degrees from the longitudinal axis of the magnetic recording tape.

A controller-implemented method according to one embodiment includes causing, by the controller, reading of at least one servo track of a magnetic recording tape, the at least one servo track having a plurality of straight first magnetic bars and a plurality of straight second magnetic bars spaced from the first magnetic bars. A width of each of the at least one servo track is defined in a direction perpendicular to a longitudinal axis of the magnetic recording tape between sides of the servo track, the sides of each servo track extending along opposing ends of each of the first magnetic bars. Lengths of the second magnetic bars between outermost ends thereof are less than the width of the associated servo track. The method further includes deriving, by the controller, at least one of velocity and skew information from reading the at least one servo track.

A product according to yet another embodiment includes a magnetic recording tape having opposite ends and at least one servo track, a longitudinal axis of the magnetic recording tape being defined between the ends. The at least one servo track has a plurality of first magnetic bars and a plurality of second magnetic bars. A width of each of the at least one servo track is defined in a direction perpendicular to the longitudinal axis of the magnetic recording tape between sides of the servo track, the sides of each servo track extending along ends of the first magnetic bars. Lengths of at least some the second magnetic bars between outer ends thereof are greater than one half the width of the associated servo track and less than the width of the associated servo track.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 8A is a partial side representational view of a magnetic recording tape according to one embodiment.

FIG. 8B is a detail representational view of the magnetic recording tape taken from box AA of FIG. 8A, according to one embodiment.

FIG. 8C is a detail representational view of an alternate embodiment of the magnetic recording tape of FIG. 8B.

FIG. 8D is a detail representational view of an alternate embodiment of the magnetic recording tape of FIG. 8B.

DETAILED DESCRIPTION

Figure 1A:
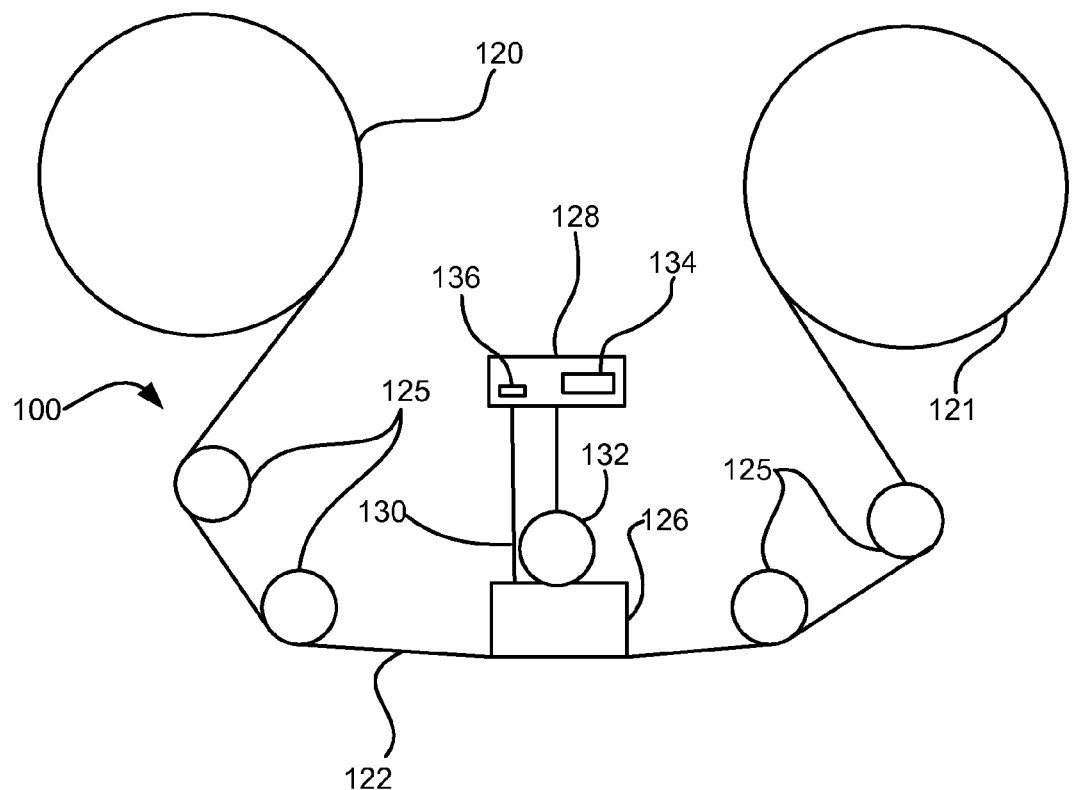
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a product includes a magnetic recording tape having opposite ends, a longitudinal axis of the magnetic recording tape being defined between the ends. The magnetic recording tape has at least one servo track, the at least one servo track having a plurality of first magnetic bars and a plurality of second magnetic bars. The first magnetic bars each have a longitudinal axis oriented between 2 and 88 degrees from the longitudinal axis of the magnetic recording tape. A width of each of the at least one servo track is defined in a direction perpendicular to the longitudinal axis of the magnetic recording tape between sides of the servo track, the sides of each servo track extending along ends of the first magnetic bars. Lengths of the second magnetic bars along the longitudinal axes thereof are less than the width of the associated servo track.

An apparatus according to one embodiment includes a magnetic head; a drive mechanism for passing such a magnetic recording tape over the magnetic head; and a controller electrically coupled to the magnetic head.

An apparatus according to another embodiment includes a magnetic head having at least one servo writer for writing the magnetic bars to a magnetic recording tape; a drive mechanism for passing the magnetic recording tape over the magnetic head; and a controller electrically coupled to the magnetic head.

In another general embodiment, a method includes writing at least one servo track on a magnetic recording tape. The at least one servo track has a plurality of first magnetic bars and a plurality of second magnetic bars. The first magnetic bars each having a longitudinal axis oriented between 2 and 88 degrees from the longitudinal axis of the magnetic recording tape. A width of each of the at least one servo track is defined between sides of the servo track in a direction perpendicular to the longitudinal axis of the magnetic recording tape, where the sides of each servo track extending along ends of the first magnetic bars. Lengths of the second magnetic bars along the longitudinal axes thereof are less than the width of the associated servo track.

An apparatus according to one embodiment includes a magnetic head having at least one servo writer to perform the foregoing method; a drive mechanism for passing the magnetic recording tape over the magnetic head; and a controller electrically coupled to the magnetic head.

An apparatus according to another embodiment includes a magnetic head; a drive mechanism for passing a magnetic recording tape over the magnetic head; and a controller electrically coupled to the magnetic head, the controller being configured to perform the foregoing method.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
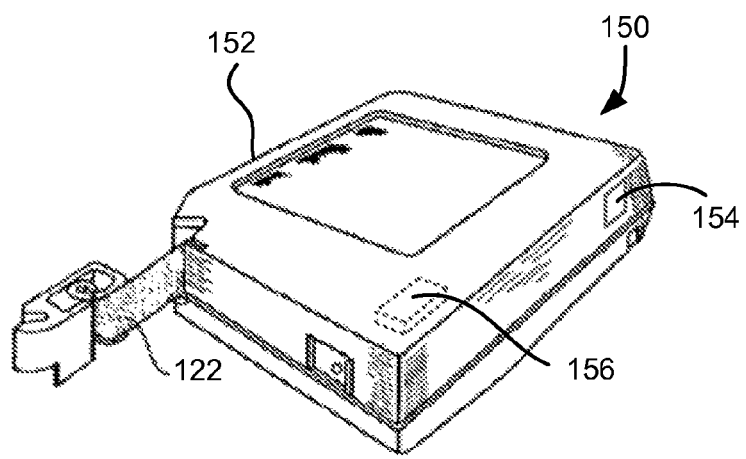
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
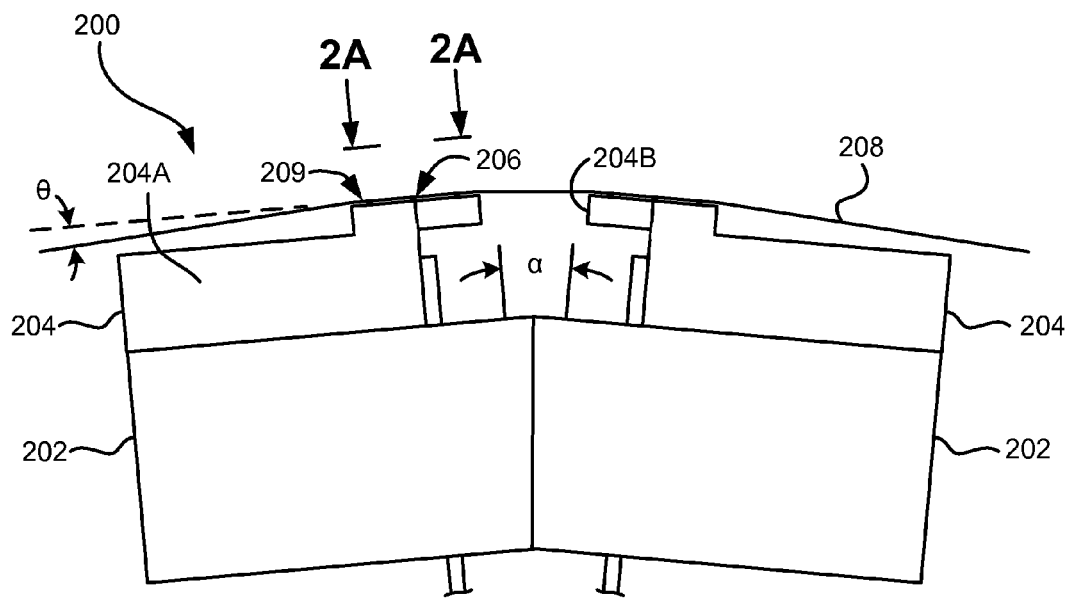
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
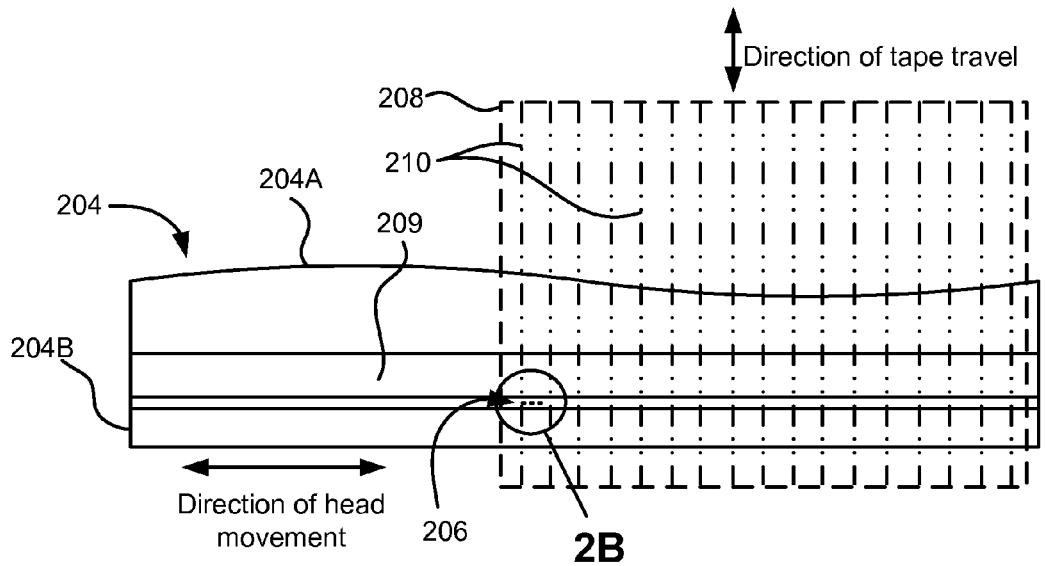
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

The servo tracks 210 also preferably include magnetic bars, e.g., see FIG. 8. As an option, the magnetic bars may provide a magnetic head with run-time information, which may include, but is not limited to speed of the tape, longitudinal and/or cross track positioning along the tape, etc. as will be discussed in further detail below.

Figure 2B:
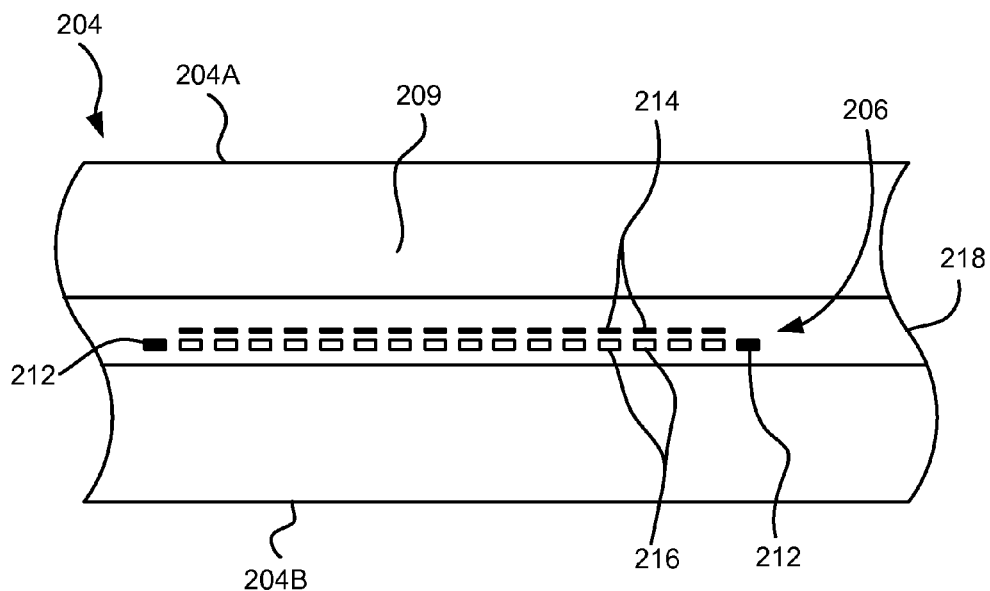
FIG. 2B is a detailed view taken from Circle 2B of FIG. 2A.

Referring now to FIG. 2B, the detailed view depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
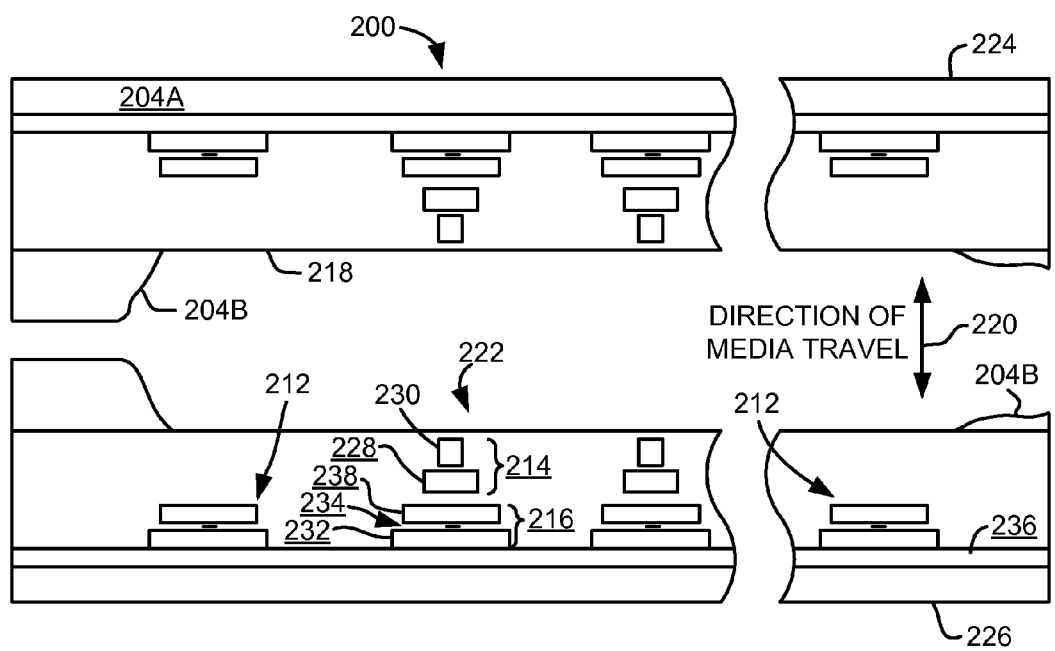
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
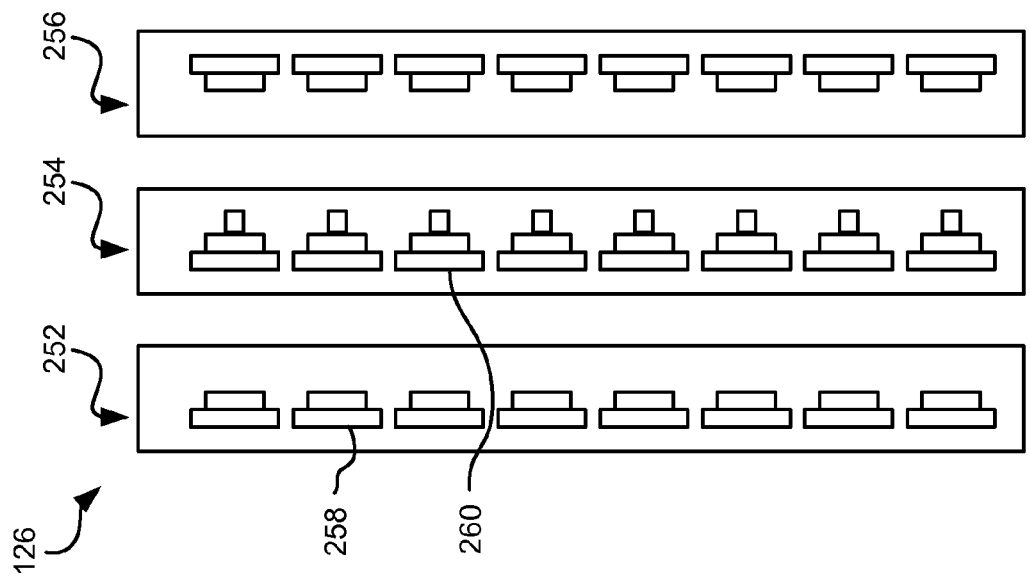
FIG. 4 is a partial tape bearing surface view of a magnetic head having a read-write-read configuration.
Figure 3:
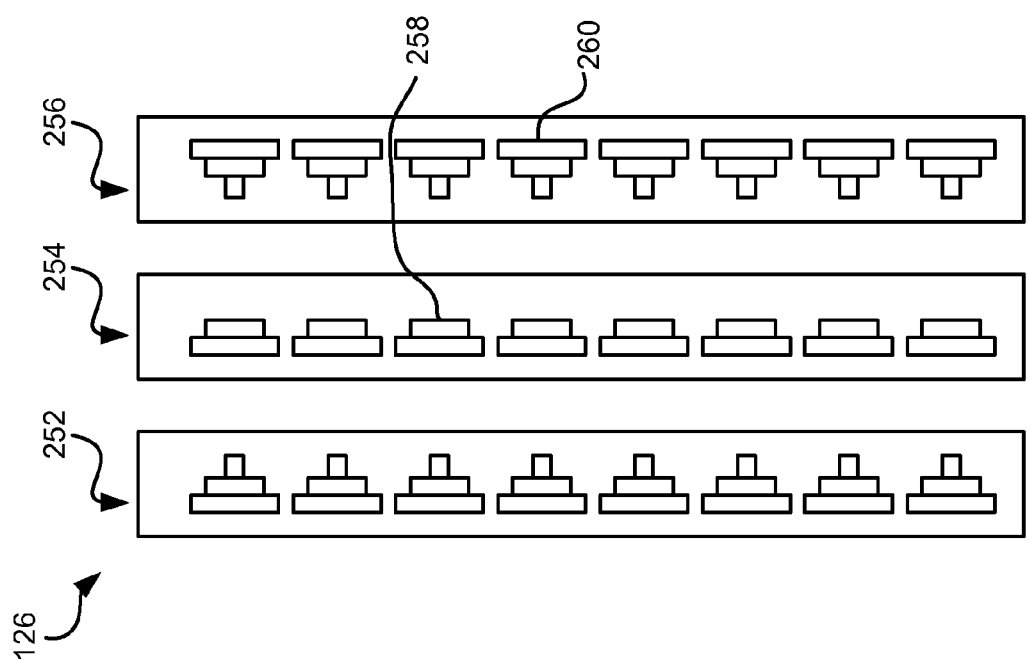
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
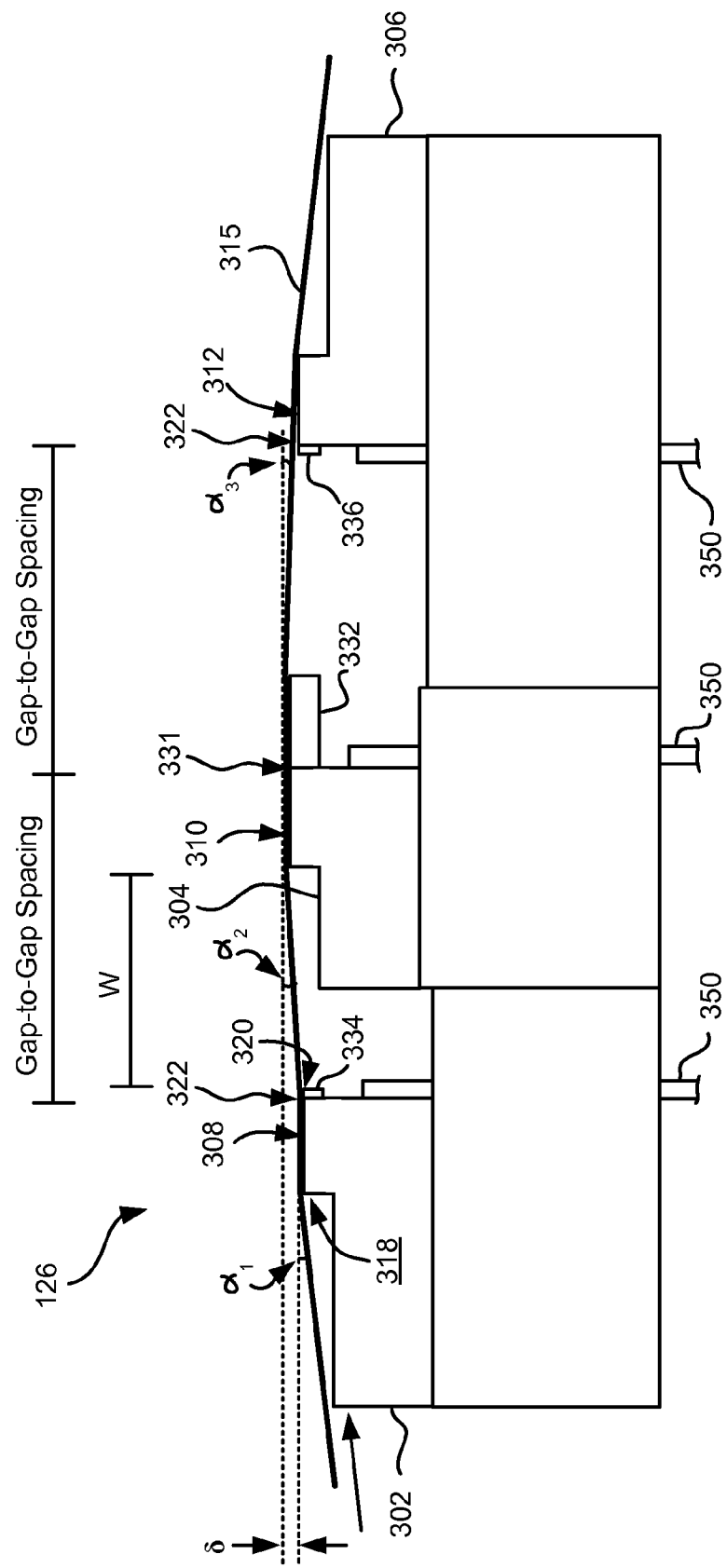
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
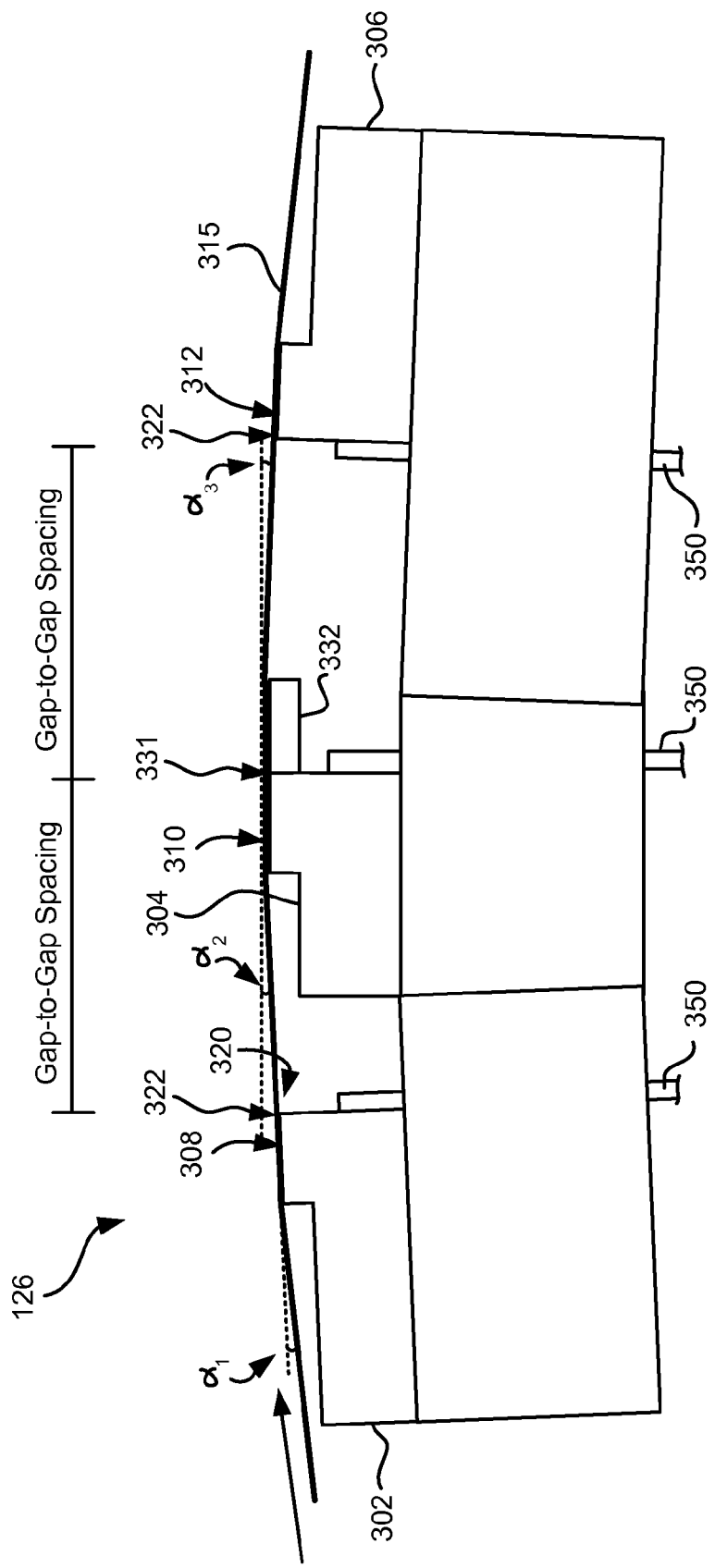
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
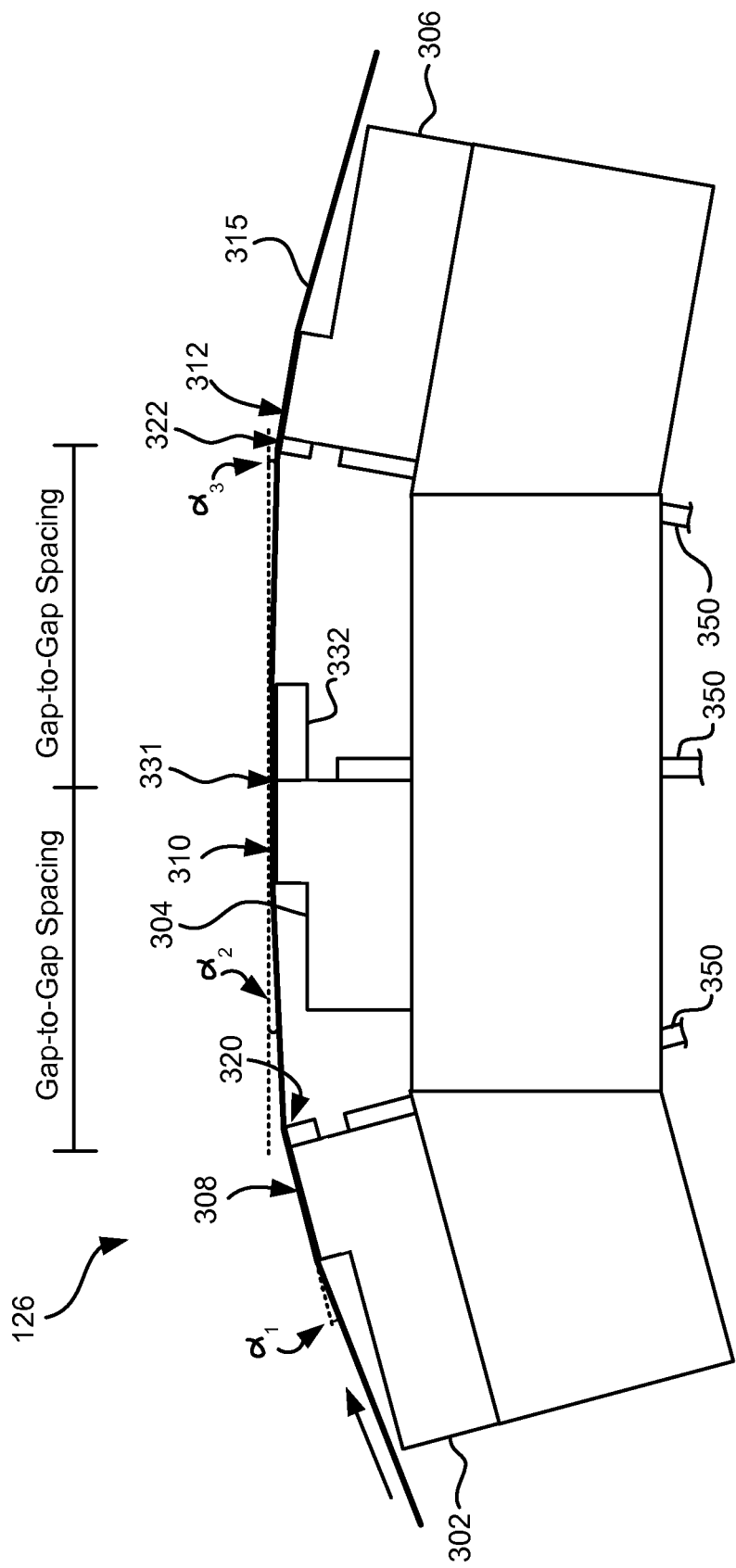
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

As alluded to above, timing based servo tracks preferably provide information about tapes during reading and/or writing operations. Such servo tracks may provide information to the drive regarding the cross track (lateral) position of the head relative to a data band flanked by the servo tracks. In various approaches, the servo tracks may include additional information, such as information that allows the drive to determine the speed of the tape, longitudinal positioning along the tape, etc.

Various embodiments described herein provide timing based servo tracks which increase, and in some approaches about double, the amount of servo information in the same physical space on a given tape, relative to conventional servo tracks having about the same physical space on tape. Thus, the areal density of servo information stored on magnetic tapes may be increased in preferred embodiments, as will soon become apparent.

FIGS. 8A-8B depict a product 800 for storing data, in accordance with one embodiment. As an option, the present product 800 may be implemented in conjunction with features from any other embodiment listed herein, such as those described with reference to the other FIGS. Of course, however, such product 800 and others presented herein may be used in various applications and/or in permutations which may or may not be specifically described in the illustrative embodiments listed herein. Further, the product 800 presented herein may be used in any desired environment.

Referring now to FIG. 8A, the product 800 includes a magnetic recording tape 802 having opposite ends 804, 806. Moreover, a longitudinal axis 808 of the magnetic recording tape 802 is defined between the ends 804, 806 thereof. It should be noted that the magnetic recording tape 802 of FIG. 8A is not drawn to scale, but rather is illustrated to show the features of the present embodiment.

Furthermore, although the magnetic recording tape 802 is shown having multiple servo tracks 810, according to various other approaches, the magnetic recording tape 802 includes at least one servo track. Thus, depending on the magnetic recording tape 802 used, the tape may include at least two, at least three, multiple, etc. servo tracks, e.g., for increased accuracy, speed, etc. Referring back to FIG. 2A, the tape 208 includes 9 servo tracks 210 in accordance with one illustrative embodiment.

The magnetic recording tape 802 may be embodied with and/or in a cartridge, such as cartridge 150 of FIG. 1A.

Referring now to the detailed view of FIG. 8B, the servo track 810 includes a plurality of first magnetic bars 812 and a plurality of second magnetic bars 814. Each of the first magnetic bars 812 preferably have a longitudinal axis, extending between opposite ends thereof, that is oriented at an angle $\phi$, between about 2 and about 88 degrees from the longitudinal axis 808 of the magnetic recording tape 802, but could be higher or lower depending on the desired embodiment. Moreover, each of the second magnetic bars 814 have a longitudinal axis oriented at an angle $\theta$ that is ±45 degrees from the longitudinal axis 808 of the magnetic recording tape 802. In a preferred embodiment, the longitudinal axes of the second magnetic bars 814 are each oriented substantially 90 degrees from the longitudinal axis 808 of the magnetic recording tape 802. Referring to the present description, "substantially 90 degrees" is intended to be within 1 degree of the stated angle (90 degrees), but could be higher or lower depending on the desired embodiment.

A servo frame may be defined as an adjacent set of the first and second magnetic bars 812, 814. Thus, in one approach, the servo track may have repeating sets of such frames. However, in preferred embodiments, the servo frames include additional bars. For example, with continued reference to FIG. 8B, the servo track 810 has a plurality of third magnetic bars 820 oriented to form chevron-like patterns with the first magnetic bars 812. The third magnetic bars 820 are also angled, e.g., between about 2 and about 90 degrees from the longitudinal axis 808 of the magnetic recording tape 802. Note that the third magnetic bars 820 may have an angular value similar to the angle of the first bars 812, but in reverse thereto at a negative angle. However, the angular values of the first and third magnetic bars may be different.

Moreover, as illustrated, the second magnetic bars 814 are positioned between sets of the first and third magnetic bars 812, 820 in a larger servo frame. The second magnetic bars 814 may be positioned away from the point of closest approach 822 of the first and third magnetic bars closest thereto. Put another way, the second magnetic bars 814 are not centered laterally in the servo track, but rather are positioned more towards the wider part of the chevron-like pattern than the narrower "tip" region thereof.

As an option, the servo track may have a plurality of fourth magnetic bars 824, the fourth magnetic bars 824 each having a longitudinal axis oriented ±45 degrees, and preferably substantially 90 degrees, from the longitudinal axis of the magnetic recording tape. The fourth magnetic bars 824 may be positioned closer to one side of the associated servo track (top of the tape in FIG. 8B) than the second magnetic bars 814.

Note that FIG. 8B depicts a 5-5-5-5 pattern (4 sets of 5 bars) in each servo frame 830. Alternative embodiments may have a 5-5-5-5-4-4-4-4 or any other pattern in a servo frame, such as an "N"-type pattern formed by some or all of the magnetic bars, an "M"-type pattern formed by some or all of the magnetic bars, a "V"-type pattern formed by some or all of the magnetic bars, etc. In this example, the shorter second and fourth bars 814, 824 are tucked in the otherwise empty and unused space between the longer first and third bars 812, 820. The second and fourth bars 814, 824 are shown orthogonal to the tape travel direction and thus may be used to provide tape skew and tape velocity detection, which are a necessary component in timing based servoing. In this manner every group of first and third magnetic bars 812, 820 can be used for position recovery.

With continued reference to FIG. 8B, the lengths of the second and fourth magnetic bars 814, 824 along the longitudinal axes thereof are less than the width of the servo track 810, where the width $w_1$ of the servo track 810 is defined in a direction perpendicular to the longitudinal axis 808 of the magnetic recording tape 802 between sides of the servo track. The sides of each servo track may be considered to extend along imaginary lines extending along ends of the first magnetic bars. The width $w_1$ of the servo track 810 may be less than about 250 microns, preferably less than 200 microns. The effective width of the servo reader is smaller, e.g., between 1 and 10 microns.

The lengths of the second and fourth magnetic bars 814, 824 are shorter than the width $w_1$ of the associated servo track 810. For example, in various approaches, the lengths of the second and/or fourth magnetic bars 814, 824 are less than 85%, more preferably less than 80% of the width $w_1$ of the associated servo track. In some approaches, the lengths of the second and/or fourth magnetic bars 814, 824 are between 33% and 67% of the width $w_1$ of the associated servo track. The lengths of the second and fourth magnetic bars 814, 824 may be the same or different. In a preferred approach, the lengths of the second and/or fourth magnetic bars 814, 824 are slightly longer than one-half the width $w_1$ of the associated servo track to enable decoding across the full width of the servo track 810.

In one particularly preferred embodiment, depicted in FIG. 8C as a variant of the embodiment of FIG. 8B, the lengths of at least some of the second and/or fourth magnetic bars are one half a width $w_1$ of the servo band, plus 0.25 to 3 microns. This range covers one half the track width of present and future servo readers, and thus the servo reader should always be able to detect the second and/or fourth magnetic bars 814, 824. Moreover, where both second and fourth magnetic bars 814, 824 are present, the detection of both second and fourth magnetic bars 814, 824 may be used as a reference indicative of the longitudinal centerline 834 of the servo track 810. Such information may be useful, e.g., for calibration during operation.

In another embodiment, depicted in FIG. 8D as a variant of the embodiment of FIG. 8B, the lengths of at least some of the second and/or fourth magnetic bars are one half a width of the servo band, minus 0.25 to 3 microns. In this case, the lack of detection of second and fourth magnetic bars 814, 824 may be used as a reference.

The timing between one of the first and one of the third magnetic bars 812, 820 may be used in conjunction with linear tape velocity information to determine the lateral position of the head relative to the tape.

The linear tape velocity information may be derived from selected magnetic bars in a single servo frame, e.g., by determining a timing between the first and last ones of the second magnetic bars 814 in one servo frame, by determining a timing between the two of the fourth magnetic bars 824 in one servo frame, the timing between one of the second and one of the fourth magnetic bars 814, 824; etc. The timing can then be correlated to the distance the tape has traveled to compute the velocity. Lookup tables may also be used. A benefit of deriving the timing for determining the linear velocity using the second or fourth bars is that they are less susceptible to tape skew and other effects. Moreover, the timing may be determined within the frame, and used to quickly compute the lateral position using the chevron-derived information, thereby enabling much faster lateral positioning. In alternate embodiments, the linear tape velocity information may be derived using magnetic bars in sequential servo frames.

Spacing may be present between servo frames to assist the system in detecting the locations of the frames, e.g., by detecting the delay between servo frames.

In one approach, the tape skew may be detected by detecting an offset in the signals of the servo readers above the parallel servo tracks as they detect the second and/or fourth magnetic bars 814, 824. If no tape or head skew is present, and the second and/or fourth magnetic bars 814, 824 are aligned laterally on the tape, then no difference in the servo signals should be detected. If skew is present, the timing of the servo signal from one servo reader will be offset from the timing of the servo signal from the other servo reader. The magnitude and sign of this offset directly relate to the direction and magnitude of the skew. This is enabled because the second and/or fourth magnetic bars 814, 824 are oriented orthogonal to the longitudinal axis 808 of the magnetic recording tape 802.

As noted above, the sets of the magnetic bars may be grouped into servo frames 830. Preferably, a position of at least one of the first magnetic bars in one of the frames is different than in other frames thereby defining encoded information in the servo track, as shown at 832. In other words, one or more of the bars may be advanced or delayed by some amount that is detectable and usable to discern additional information. For example, such encoded information may include linear position information, etc. Encoding schemes of a type known in the art may be used.

The magnetic tape 802 may be used by an apparatus such as that shown in FIG. 1.

Figure 9:
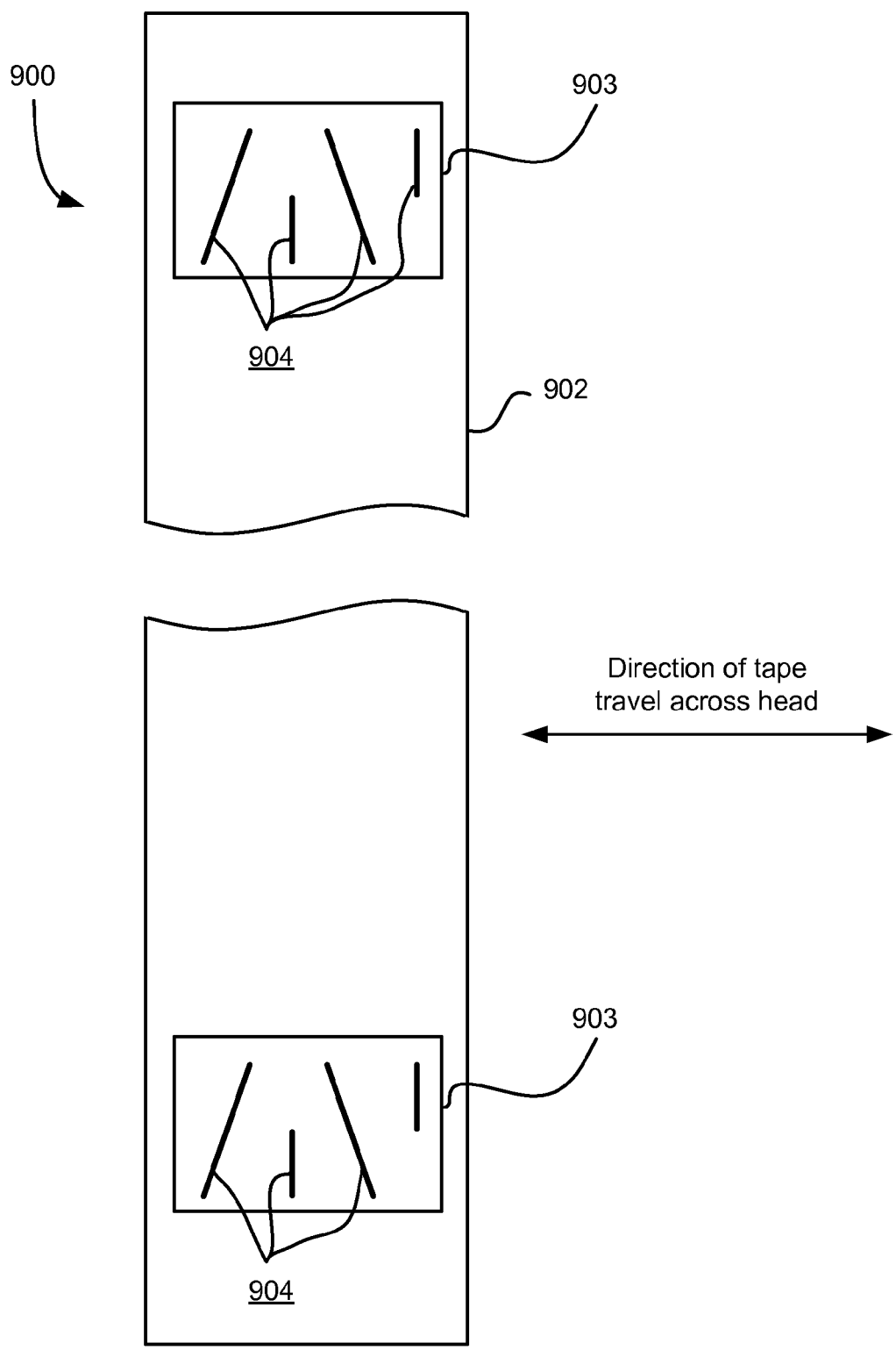
FIG. 9 is a side view of an apparatus for writing a servo pattern on a magnetic recording tape, according to one embodiment.

FIG. 9 depicts an apparatus 900 to write the servo patterns onto the magnetic recording tape, in accordance with one embodiment. As an option, the present apparatus 900 may be implemented in conjunction with features from any other embodiment listed herein, such as those described with reference to the other FIGS. Of course, however, such apparatus 900 and others presented herein may be used in various applications and/or in permutations which may or may not be specifically described in the illustrative embodiments listed herein. Further, the apparatus 900 presented herein may be used in any desired environment. Thus FIG. 9 (and the other Figures) should be deemed to include any and all possible permutations.

The apparatus 900 may include one or more magnetic heads 902 each having at least one servo writer 903 for writing the magnetic bars to the magnetic recording tape. Ideally, enough servo writers 903 are present to write all servo tracks on the tape simultaneously. As shown, each servo writer 902 has write gaps 904 oriented to write sets of the magnetic bars on the magnetic recording tape for creating a servo pattern 810 as shown in FIG. 8B. However, in other approaches, the number and/or orientation of the write gaps 904 may be different, depending on the servo pattern to be written, as would be understood by one skilled in the art upon reading the present description.

The apparatus 900 may also include a drive mechanism for passing the magnetic recording tape over the magnetic head, e.g., as shown in FIG. 1A; and a controller electrically coupled to the magnetic head, e.g., as also shown in FIG. 1A. The controller may use known servo writing techniques when controlling the magnetic head 902.

In operation, one or more servo tracks are written to a magnetic tape by the apparatus. The write gaps 904 may each emit flux concurrently. In other approaches, one or more of the write gaps may be separately addressable from the other write gaps. Accordingly, such separately-addressable write gaps may be associated with a different write coil and yoke than the other write gaps.

Furthermore, any of the embodiments described above may be implemented with previous data and/or tape formats, generations, platforms, etc. Moreover, various embodiments described herein may provide additional information for decoding tape skew within a single module rather than using servo readers on two modules, as conventionally required.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A product, comprising:
    a magnetic recording tape having opposite ends and at least one servo track, a longitudinal axis of the magnetic recording tape being defined between the ends;
    the at least one servo track having a plurality of straight first magnetic bars and a plurality of straight second magnetic bars spaced from the first magnetic bars,
    wherein a width of each of the at least one servo track is defined in a direction perpendicular to the longitudinal axis of the magnetic recording tape between sides of the servo track, the sides of each servo track extending along opposite ends of each of the first magnetic bars,
    wherein lengths of the second magnetic bars between outermost ends thereof are less than the width of the associated servo track,
    wherein the at least one servo track has a plurality of fourth magnetic bars, wherein the fourth magnetic bars are positioned closer to one side of the associated servo track than are the second magnetic bars.

2. The product as recited in claim 1, wherein the at least one servo track has a plurality of third magnetic bars oriented to form chevron-like patterns with the first magnetic bars, the second magnetic bars being positioned between sets of the first and third magnetic bars in a servo frame.

3. The product as recited in claim 1, wherein the first magnetic bars each have a longitudinal axis oriented between 2 and 88 degrees from the longitudinal axis of the magnetic recording tape.

4. The product as recited in claim 1, wherein the lengths of the second magnetic bars are less than 80% of the width of the associated servo track, the second magnetic bars each having a longitudinal axis oriented substantially 90 degrees from the longitudinal axis of the magnetic recording tape.

5. The product as recited in claim 1, wherein sets of the magnetic bars are grouped into servo frames, wherein a position of at least one of the first magnetic bars in one of the frames is different than in other frames thereby defining encoded information in the servo track.

6. A product, comprising:
    a magnetic recording tape having opposite ends and at least one servo track, a longitudinal axis of the magnetic recording tape being defined between the ends;
    the at least one servo track having a plurality of straight first magnetic bars and a plurality of straight second magnetic bars spaced from the first magnetic bars,
    wherein a width of each of the at least one servo track is defined in a direction perpendicular to the longitudinal axis of the magnetic recording tape between sides of the servo track, the sides of each servo track extending along opposite ends of each of the first magnetic bars,
    wherein lengths of the second magnetic bars between outermost ends thereof are less than the width of the associated servo track,
    wherein the lengths of at least some of the second magnetic bars are one half a width of the associated servo track plus or minus 0.25 to 3 microns.

7. The product as recited in claim 1, wherein the lengths of at least some of the second magnetic bars are one half a width of the associated servo track plus or minus 0.25 to 3 microns.

8. An apparatus, comprising:
a magnetic head;
a drive mechanism for passing the magnetic recording tape of claim 1 over the magnetic head; and
a controller electrically coupled to the magnetic head, the controller being configured to decode the servo track(s) of the magnetic recording tape.

9. An apparatus, comprising:
a magnetic head having at least one servo writer for writing the magnetic bars to the magnetic recording tape of claim 1;
a drive mechanism for passing the magnetic recording tape over the magnetic head; and
a controller electrically coupled to the magnetic head.

10. A computer program product for writing servo tracks on a magnetic recording tape, the computer program product comprising a computer readable storage medium having program instructions embodied therewith, wherein the computer readable storage medium is not a transitory signal per se, the program instructions executable by a controller to cause the controller to perform a method comprising:
cause, by the controller, writing of at least one servo track on a magnetic recording tape,
the at least one servo track having a plurality of first magnetic bars and a plurality of second magnetic bars,
wherein a width of each of the at least one servo track is defined between sides of the servo track in a direction perpendicular to a longitudinal axis of the magnetic recording tape, the sides of each servo track extending along ends of the first magnetic bars,
wherein lengths of the second magnetic bars between outermost ends thereof are less than the width of the associated servo track,
straight portions of the second magnetic bars each having a longitudinal axis oriented substantially 90 degrees from the longitudinal axis of the magnetic recording tape.

11. The computer program product as recited in claim 10, wherein the at least one servo track has a plurality of third magnetic bars oriented to form chevron-like patterns with the first magnetic bars, the second magnetic bars being positioned between sets of the first and third magnetic bars in a servo frame.

12. The computer program product as recited in claim 10, wherein the first magnetic bars each have a longitudinal axis oriented between 2 and 88 degrees from the longitudinal axis of the magnetic recording tape.

13. The computer program product as recited in claim 10, wherein the at least one servo track has a plurality of fourth magnetic bars, wherein the fourth magnetic bars are positioned closer to one side of the associated servo track than are the second magnetic bars.

14. The computer program product as recited in claim 10, wherein the lengths of the second magnetic bars are less than 80% of the width of the associated servo track.

15. The computer program product as recited in claim 10, wherein sets of the magnetic bars are grouped into servo frames, wherein a position of at least one of the first magnetic bars in one of the frames is different than in other frames thereby defining encoded information in the servo track.

16. An apparatus, comprising:
the computer program product as recited in claim 10;
a magnetic head;
a drive mechanism for passing a magnetic recording tape over the magnetic head; and
the controller electrically coupled to the magnetic head.

* * * * *